United States Patent
Iwase (10) Patent No.: US 12,076,922 B2
(45) Date of Patent: Sep. 3, 2024

(54) THREE-DIMENSIONAL PRINTING DEVICE

(71) Applicant: Roland DG Corporation, Hamamatsu (JP)

(72) Inventor: Fumiyoshi Iwase, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 449 days.

(21) Appl. No.: 17/494,871

(22) Filed: Oct. 6, 2021

(65) Prior Publication Data

US 2023/0106723 A1    Apr. 6, 2023

(51) Int. Cl.
| | |
|---|---|
| *B29C 64/209* | (2017.01) |
| *B22F 12/53* | (2021.01) |
| *B29C 64/165* | (2017.01) |
| *B29C 64/255* | (2017.01) |
| *B29C 64/393* | (2017.01) |
| *B33Y 30/00* | (2015.01) |
| *B33Y 50/02* | (2015.01) |

(52) U.S. Cl.
CPC ............ *B29C 64/209* (2017.08); *B22F 12/53* (2021.01); *B29C 64/165* (2017.08); *B29C 64/255* (2017.08); *B29C 64/393* (2017.08); *B33Y 30/00* (2014.12); *B33Y 50/02* (2014.12)

(58) Field of Classification Search
CPC .................................................. B29C 64/209
See application file for complete search history.

(56) References Cited

U.S. PATENT DOCUMENTS

| | | | |
|---|---|---|---|
| 2009/0153606 A1 | 6/2009 | Mizutani et al. | |
| 2011/0129640 A1* | 6/2011 | Beall | C04B 35/63492 |
| | | | 428/116 |
| 2014/0232788 A1 | 8/2014 | Ohashi et al. | |
| 2017/0106590 A1 | 4/2017 | Hakkaku | |
| 2018/0229428 A1 | 8/2018 | Takano | |
| 2018/0354192 A1* | 12/2018 | Iwase | B33Y 40/00 |
| 2018/0370140 A1 | 12/2018 | Iwase | |

(Continued)

FOREIGN PATENT DOCUMENTS

| | | |
|---|---|---|
| JP | 2009-160930 A | 7/2009 |
| JP | 2014-156045 A | 8/2014 |

(Continued)

OTHER PUBLICATIONS

Official Communication issued in corresponding European Patent Application No. 21200946.8, mailed on Mar. 16, 2022.

(Continued)

*Primary Examiner* — J C Jacyna
(74) *Attorney, Agent, or Firm* — Keating & Bennett, LLP (57) ABSTRACT

A three-dimensional printing device includes a printing tank to accommodate a powder material and including an opening in at least a portion thereof, and an ejector facing the opening of the printing tank to eject a curing liquid to cure the powder material toward the opening. The ejector includes nozzle strings each including nozzles side by side in a first direction. The nozzles each eject the curing liquid and are located in each of the nozzle strings at a density of about 1200 dpi or lower in the first direction. The nozzle strings are spaced away from each other by a distance of about 5 mm or longer in a second direction perpendicular to the first direction.

8 Claims, 6 Drawing Sheets

(56) References Cited

U.S. PATENT DOCUMENTS

2020/0398558 A1* 12/2020 Uchida ................. B41J 2/155
2021/0323228 A1   10/2021 Przybyla et al.

FOREIGN PATENT DOCUMENTS

| JP | 2014156045 | * | 8/2014 | ......... | B41J 2/04581 |
| --- | --- | --- | --- | --- | --- |
| JP | 5794283 | B2 | 10/2015 | | |
| JP | 2016-060195 | A | 4/2016 | | |
| JP | 2017-077642 | A | 4/2017 | | |
| JP | 2018-030239 | A | 3/2018 | | |
| JP | 2018-126974 | A | 8/2018 | | |
| JP | 2019-006050 | A | 1/2019 | | |
| JP | 2021-507831 | A | 2/2021 | | |
| JP | 2021-178471 | A | 11/2021 | | |
| JP | 2021178471 | * | 11/2021 | ............. | Y02P 10/25 |

OTHER PUBLICATIONS

Anonymous, "Five Reasons High DPI Doesn't Equal High-Quality in Binder Jetting," ExOne, Jun. 14, 2021, URL: https://web.archive.org/web/20210614181014/https://www.exone.com/en-US/Resources/News/Five-Reasons-High-DPI-Doesn-t-Equal-High-Quality, 8 pages.
Anonymous, "What is Binder Jetting?," ExOne, Aug. 27, 2021, URL:https://web.archive.org/web/20210827082512/https://www.exone.com/en-US/resources/case-studies/what-is-binder-jetting, 5 pages.

* cited by examiner

| | THREE-DIMENSIONAL PRINTING DEVICE 10 | ANOTHER THREE-DIMENSIONAL PRINTING DEVICE |
|---|---|---|
| INTER-NOZZLE DISTANCE (mm) | 11 | |
| HEAD GAP (mm) | 2.0 | 2.3 |
| SCANNING SPEED (mm/s) | 150 | |
| NOZZLE DENSITY (dpi) | 1200 | 180 |
| INJECTION DENSITY IN MAIN SCANNING DIRECTION (dpi) | 1200 | 720 |
| VOLUME OF LIQUID DROP (pl) | 8 | 38 |
| THICKNESS OF CURED LAYER (mm) | 0.1 | |
| POWDER MATERIAL | 85% OF CERAMIC POWDER + 15% OF BINDER POWDER (AVERAGE PARTICLE DIAMETER 50 μm) | |
| CURING LIQUID | WATER (CONTAINING 5% OF SURFACTANT) | |
| NUMBER OF TIMES OF STACKING | 100 | 3 |
| RESULTS ON ATTACHMENT | ○ | × |

THREE-DIMENSIONAL PRINTING DEVICE

BACKGROUND OF THE INVENTION

1. Field of the Invention

The present invention relates to a three-dimensional printing device.

2. Description of the Related Art

Conventionally, a device that ejects a curing liquid into a powder material to form a thin cured layer having a desired cross-sectional shape and stacks such cured layers to form a three-dimensional printing object is known. For example, Japanese Laid-Open Patent Publication No. 2018-126974 discloses a three-dimensional printing device including a printing tank in which a printing object is printed, a powder transfer portion that supplies a powder material to the printing tank, and an ejection head that ejects a curing liquid that cures the powder material.

In, for example, the powder curing-type three-dimensional printing device as described in Japanese Laid-Open Patent Publication No. 2018-126974, the powder material in the printing tank may soar in the air due to the ejection of the curing liquid. When the powder material that has soared is attached to a nozzle of an ejection head, there may be an undesirable possibility that the attached powder material is cured by the curing liquid. When the powder material attached to the nozzle is cured, an inconvenience occurs such that, for example, the nozzle is clogged or the flying direction of the curing liquid is curved.

SUMMARY OF THE INVENTION

Preferred embodiments of the present invention provide three-dimensional printing devices that each prevent a powder material from being attached to a nozzle due to ejection of a curing liquid.

A first three-dimensional printing device disclosed herein includes a printing tank to accommodate a powder material and including an opening in at least a portion thereof, and an ejector facing the opening of the printing tank to eject a curing liquid to cure the powder material toward the opening. The ejector includes a plurality of nozzle strings each including a plurality of nozzles to eject the curing liquid and located side by side in a predetermined first direction. The plurality of nozzles are located in each of the plurality of nozzle strings at a density of about 1200 dpi or lower in the first direction. The plurality of nozzle strings are spaced away from each other by a distance of about 5 mm or longer in a second direction perpendicular to the first direction.

According to the knowledge of the present inventor, in the case where the density of the plurality of nozzles in the nozzle strings in the three-dimensional printing device is set to a certain value or lower and the plurality of nozzle strings are spaced away from each other by a certain distance or longer, the powder material in the printing tank is prevented from soaring due to the ejection of the curing liquid. As a result, the attachment of the powder material to the nozzles is reduced or prevented. In the above-described first three-dimensional printing device, the density of the plurality of nozzles in the nozzle strings is preferably about 1200 dpi or lower, and the plurality of nozzle strings are spaced away from each other by a distance of about 5 mm or longer, for example. Therefore, the attachment of the powder material to the nozzles due to the ejection of the curing liquid may be prevented.

A second three-dimensional printing device disclosed herein includes a printing tank to accommodate a powder material and including an opening in at least a portion thereof, an ejector facing the opening of the printing tank to eject a curing liquid to cure the powder material toward the opening, and a controller to control the ejector to eject the curing liquid. The ejector includes a first nozzle string, a second nozzle string, and a third nozzle string. The first nozzle string includes a first plurality of nozzles located side by side in a predetermined first direction to eject the curing liquid. The second nozzle string includes a second plurality of nozzles located side by side in the first direction to eject the curing liquid. The third nozzle string includes a third plurality of nozzles located side by side in the first direction to eject the curing liquid. The first nozzle string and the second nozzle string are spaced away from each other by a distance shorter than a predetermined first distance in a second direction perpendicular to the first direction. The first nozzle string and the third nozzle string are spaced away from each other by a distance equal to, or longer than, the first distance in the second direction. The controller is configured or programmed to, in at least a portion of a time duration in which the ejector ejects the curing liquid, cause the curing liquid to be ejected from the first plurality of nozzles of the first nozzle string and the third plurality of nozzles of the third nozzle string but not to be ejected from the second plurality of nozzles of the second nozzle string.

In the above-described second three-dimensional printing device, in at least a portion of the time duration in which the ejector ejects the curing liquid, the curing liquid is not ejected from the second plurality of nozzles of the second nozzle string, which is spaced away from the first nozzle string by a distance shorter than the first distance. Therefore, in at least the portion of the time duration, the curing liquid is not ejected at the same time from the first plurality of nozzles of the first nozzle string and the second plurality of nozzles of the second nozzle string, which are located at a distance, from each other, shorter than the first distance. Thus, the attachment of the powder material to the nozzles due to the ejection of the curing liquid is prevented or reduced due to substantially the same reason as that for the three-dimensional printing device according to the preferred embodiment of the present invention described above.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Hereinafter, preferred embodiments of three-dimensional printing devices according to the present invention will be described with reference to the drawings. The preferred embodiments described herein are not intended to specifically limit the present invention. Components and portions that have the same functions will bear the same reference signs, and overlapping descriptions will be omitted or simplified.

Figure 1:
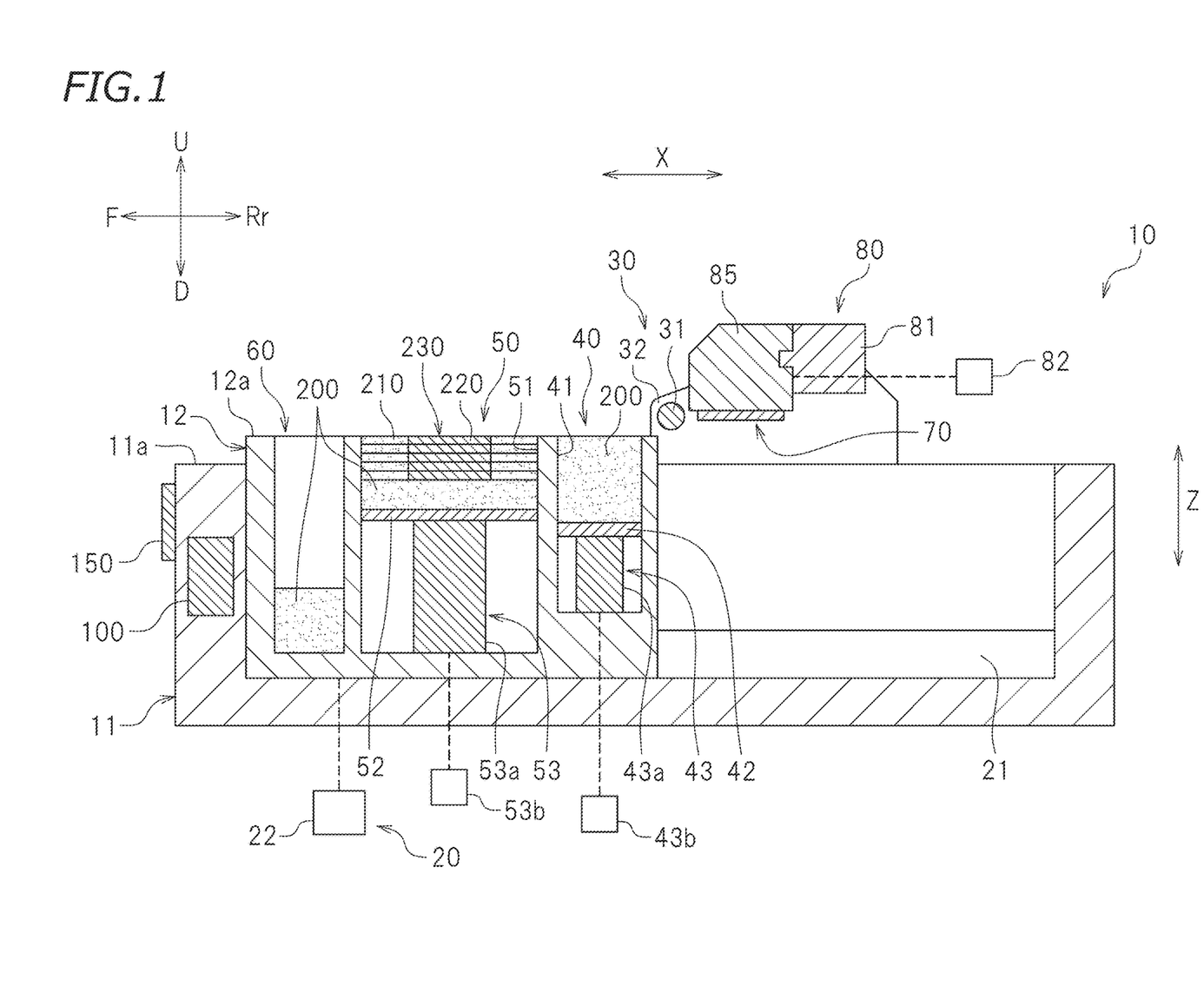
FIG. 1 is a cross-sectional view schematically showing a three-dimensional printing device according to preferred embodiment 1 of the present invention.
Figure 2:
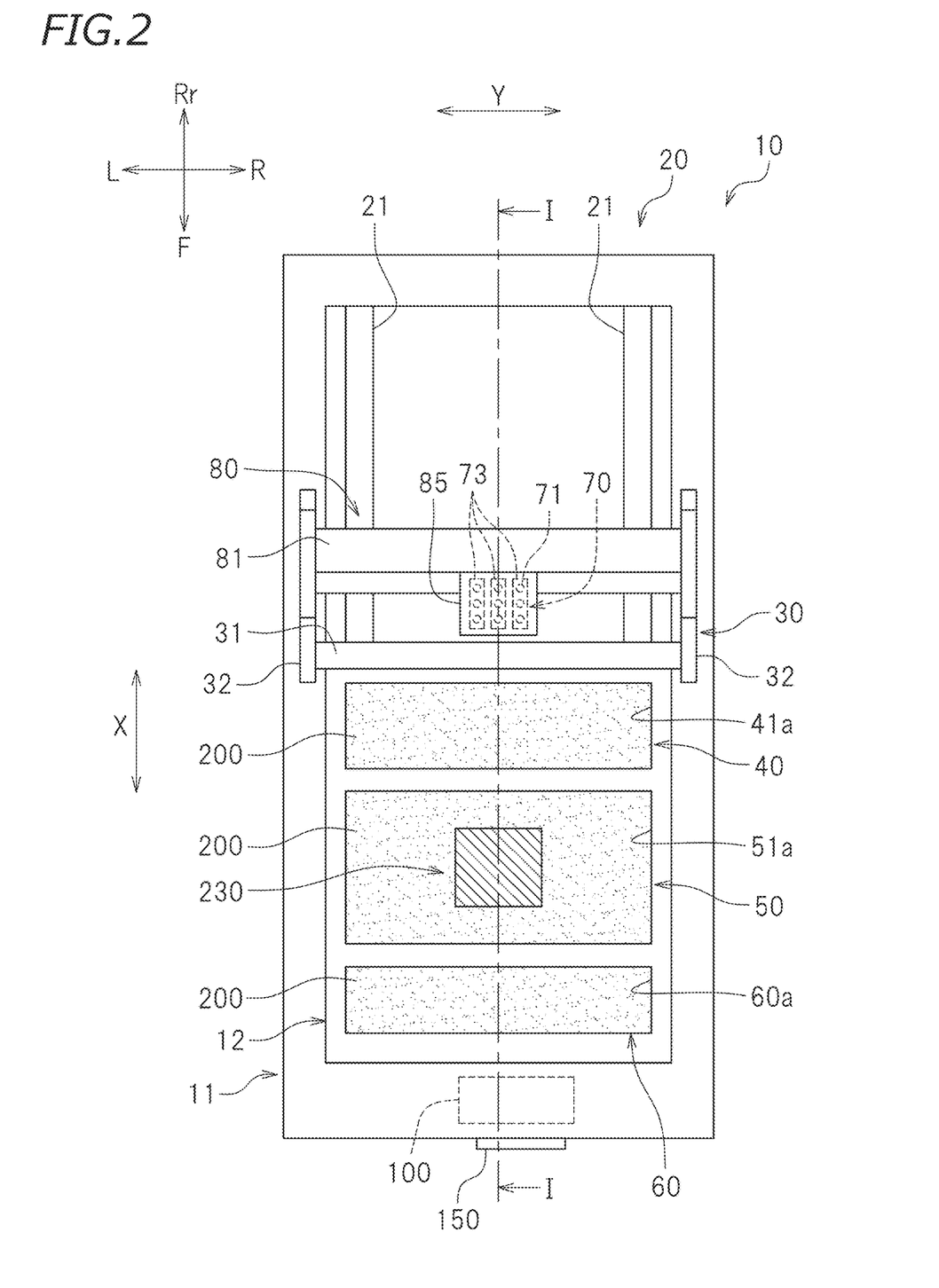
FIG. 2 is a plan view schematically showing the three-dimensional printing device according to preferred embodiment 1 of the present invention.

FIG. 1 is a cross-sectional view schematically showing a three-dimensional printing device 10 according to preferred embodiment 1 of the present invention. FIG. 2 is a plan view of the three-dimensional printing device 10. FIG. 1 is a cross-sectional view of the three-dimensional printing device 10 taken along line I-I in FIG. 2. In the figures, letter F represents "front", and letter Rr represents "rear". In this preferred embodiment, "left", "right", "up" and "down" for a viewer who is looking at the three-dimensional printing device 10 from the side of letter F are respectively left, right, up and down of the three-dimensional printing device 10. In the figures, letters L, R, U and D respectively represent "left", "right", "up" and "down". Letters X, Y and Z respectively represent a front-rear direction, a left-right direction, and an up-down direction. The left-right direction Y is a main scanning direction of the three-dimensional printing device 10. The front-rear direction X is a sub scanning direction of the three-dimensional printing device 10. The up-down direction Z is a stacking direction in which layers are stacked during three-dimensional printing. The main scanning direction Y, the sub scanning direction X and the up-down direction Z are perpendicular to each other. These directions are merely defined for the sake of convenience, and do not limit the manner of installation of the three-dimensional printing device 10 in any way.

As shown in FIG. 1, the three-dimensional printing device 10 includes a main body 11, a printing tank unit 12, a roller unit 30, a carriage 85, a head unit 70, a sub scanning direction moving mechanism 20, a main scanning direction moving mechanism 80, and a controller 100. The printing tank unit 12 accommodates a supply tank 40, a printing tank 50 and a powder recovery tank 60. The three-dimensional printing device 10 prints a printing object 230 as follows. A powder material 200 supplied from the supply tank 40 is flattened in the printing tank 50 to form a powder layer 210. A curing liquid is ejected toward a desired position in the powder layer 210 and cures the powder layer 210, and thus a cured layer 220 is formed. Such cured layers 220 are stacked in an upward direction to form the printing object 230.

As shown in FIG. 2, the main body 11 is an outer casing of the three-dimensional printing device 10, and is long in the sub scanning direction X. The main body 11 has a shape of a box that is opened upward. The main body 11 accommodates the sub scanning direction moving mechanism 20, the printing tank unit 12 and the controller 100. As shown in FIG. 1, the main body 11 supports the roller unit 30 and the main scanning direction moving mechanism 80.

As shown in FIG. 1, the printing tank unit 12 is accommodated in the main body 11. A top surface 12a of the printing tank unit 12 is flat. The printing tank 50, the supply tank 40 and the powder recovery tank 60 are provided side by side and recessed from the top surface 12a independently.

The supply tank 40 is located in a rear portion of the printing tank unit 12. The supply tank 40 stores the powder material 200 before the powder material 200 is supplied to the printing tank 50. As shown in FIG. 1, the supply tank 40 includes a cylindrical portion 41 extending in the up-down direction. As shown in FIG. 2, the cylindrical portion 41 includes an opening 41a opened upward. The opening 41a is rectangular as seen in a plan view. The opening 41a is not limited to having a rectangular planar shape.

There is no specific limitation on the composition, the form or the like of the powder material 200. The powder material 200 may be made of any of various materials including a resin material, a metal material, an inorganic material and the like. Examples of the material of the powder material 200 include ceramic materials such as alumina, silica, titania, zirconia and the like; iron, aluminum, titanium and an alloy thereof (typically, stainless steel, titanium alloy, aluminum alloy); hemihydrate gypsum (α-type hemihydrate gypsum, β-type hemihydrate gypsum); apatite; salt; plastic materials; and the like. The powder material 200 may be made of one of these materials or a mixture of two or more of these materials. In the case where the powder material 200 is made of a mixture of materials, particles of different materials may have different particle diameters. For example, particles used as a binder may be finer than particles used as an aggregate.

A supply table 42 having the same shape as that of the cylindrical portion 41 as seen in a plan view is accommodated in the cylindrical portion 41. As shown in FIG. 1, the supply table 42 has a shape of a flat plate. The supply table 42 is inserted into the cylindrical portion 41 generally horizontally. The supply table 42 is movable in the up-down direction in the cylindrical portion 41. A supply table elevation mechanism 43 is provided below the supply table 42. The supply table elevation mechanism 43 supports, and moves up and down, the supply table 42. In this preferred embodiment, the supply table elevation mechanism 43 supports the supply table 42 from below. The supply table elevation mechanism 43 includes a support portion 43a, a driving motor 43b, and a ball screw (not shown). The support portion 43a is connected with a bottom surface of the supply table 42. The support portion 43a is connected with the driving motor 43b via the ball screw. The driving motor 43b is driven, and as a result, the support portion 43a is moved in the up-down direction. The supply table 42 is supported by the support portion 43a, and moves in the up-down direction together with the support portion 43a. The driving motor 43b is electrically connected with the controller 100, and is controlled by the controller 100. The driving motor 43b is, for example, a servo motor, and is capable of controlling the level in the up-down direction of the supply table 42.

As shown in FIG. 2, the printing tank 50 is provided to the front of the supply tank 40. The supply tank 40 and the printing tank 50 are provided side by side in the sub scanning direction X. The printing tank 50 is positionally aligned with the supply tank 40 in the main scanning direction Y. The printing tank 50 has a shape of a box, and includes an opening in at least a part thereof. In more detail, the printing tank 50 includes a cylindrical portion 51 (see FIG. 1) extending in the up-down direction. The cylindrical portion 51 includes an opening 51a opened upward. The printing tank 50 accommodates the powder material 200. In the printing tank 50, the printing object 230 is printed of the powder material 200. As shown in FIG. 2, the opening 51a is rectangular as seen in a plan view. The opening 51a is not limited to having a rectangular planar shape. As seen in a plan view, the opening 51a has a length in the main scanning direction Y equal to a length of the opening 41a of the supply tank 40 in the main scanning direction Y. Alternatively, the length of the opening 51a of the printing tank 50 in the main scanning direction Y may be shorter than the length of the opening 41a of the supply tank 40 in the main scanning direction Y.

As shown in FIG. 1, a printing table 52 having the same shape as that of the cylindrical portion 51 as seen in a plan view is accommodated in the cylindrical portion 51. For printing the printing object 230, the powder material 200 is supplied onto the printing table 52, and the printing is performed on the printing table 52. As shown in FIG. 1, the printing table 52 has a shape of a flat plate. The printing table 52 is inserted into the cylindrical portion 51 generally horizontally. The printing table 52 is movable in the up-down direction in the cylindrical portion 51. A printing table elevation mechanism 53 is provided below the printing table 52. The printing table elevation mechanism 53 supports, and moves up and down, the printing table 52. In this preferred embodiment, the printing table elevation mechanism 53 supports the printing table 52 from below. The printing table elevation mechanism 53 includes a support portion 53a, a driving motor 53b, and a ball screw (not shown). The support portion 53a is connected with a bottom surface of the printing table 52. The support portion 53a is connected with the driving motor 53b via the ball screw. The driving motor 53b is driven, and as a result, the support portion 53a is moved in the up-down direction. The printing table 52 is supported by the support portion 53a, and moves in the up-down direction together with the support portion 53a. The driving motor 53b is electrically connected with the controller 100, and is controlled by the controller 100. The driving motor 53b is, for example, a servo motor, and is capable of controlling the level in the up-down direction of the printing table 52.

The powder recovery tank 60 recovers a portion of the powder material 200 that is not accommodated in the printing tank 50 when the powder material 200 is spread in the printing tank 50. The powder recovery tank 60 is located to the front of the printing tank 50. As shown in FIG. 2, the powder recovery tank 60 is provided side by side with the printing tank 50 and the supply tank 40 in the sub scanning direction X. The powder recovery tank 60 is positionally aligned with the printing tank 50 in the main scanning direction Y. The powder recovery tank 60 includes an opening 60a opened upward. The opening 60a is rectangular as seen in a plan view. The opening 60a is not limited to having a rectangular planar shape. As seen in a plan view, the opening 60a has a length in the main scanning direction Y equal to the length of each of the opening 41a of the supply tank 40 and the opening 51a of the printing tank 50 in the main scanning direction Y. Alternatively, the length of the opening 60a of the powder recovery tank 60 in the main scanning direction Y may be longer than the length of the opening 51a of the printing tank 50 in the main scanning direction Y.

The sub scanning direction moving mechanism 20 moves the printing tank unit 12 in the sub scanning direction X with respect to the head unit 70 and the roller unit 30. The sub scanning direction moving mechanism 20 includes a pair of guide rails 21 and a feed motor 22.

As shown in FIG. 1, the guide rails 21 (only one is shown in FIG. 1) guide the movement of the printing tank unit 12 in the sub scanning direction X. The guide rails 21 are provided in the main body 11. The guide rails 21 extend in the sub scanning direction X. The printing tank unit 12 is slidably engageable with the guide rails 21. There is no specific limitation on the position(s) or the number of the guide rails 21. The feed motor 22 is, for example, connected with the printing tank unit 12 via a ball screw or the like. The feed motor 22 is electrically connected with the controller 100. The feed motor 22 is driven to rotate, and as a result, the printing tank unit 12 is moved in the sub scanning direction X on the guide rails 21.

The sub scanning direction moving mechanism 20 and the roller unit 30 are included in a layer formation device that flattens the powder material 200, supplied by the supply tank 40, in the printing tank 50. The roller unit 30 includes a spreading roller 31 and a pair of roller support members 32 supporting the spreading roller 31. The spreading roller 31 is located above the main body 11. The spreading roller 31 is located to the front of the head unit 70. The spreading roller 31 has an elongated cylindrical shape. The spreading roller 31 is located such that an axis thereof in a longitudinal direction thereof extends in the main scanning direction Y. The spreading roller 31 is longer than the printing tank 50 in the main scanning direction Y. A bottom end of the spreading roller 31 is slightly above the printing tank unit 12 so as to form a clearance (gap) between the bottom end of the spreading roller 31 and the top surface 12a of the printing tank unit 12. The spreading roller 31 is rotatably supported by the pair of roller support members 32 provided on a top surface 11a of the main body 11. The spreading roller 31 may be rotatable by, for example, a motor connected thereto.

When the printing tank unit 12 is moved rearward by the sub scanning direction moving mechanism 20, the spreading roller 31 moves forward with respect to the supply tank 40, the printing tank 50 and the powder recovery tank 60. At this point, the spreading roller 31 moves from a position above the supply tank 40 to a position above the printing tank 50 and farther to a position above the powder recovery tank 60. At this point, the spreading roller 31 moves from a position above the supply tank 40 to a position above the powder recovery tank 60 while being kept at a predetermined level above the supply tank 40, the printing tank 50 and the powder recovery tank 60.

As shown in FIG. 2, the head unit 70 is located on a bottom surface of the carriage 85. The head unit 70 is provided so as to face the opening 51a of the printing tank 50. The head unit 70 ejects the curing liquid, curing the powder material 200, toward the opening 51a. There is no specific limitation on the mechanism that ejects the curing liquid from the head unit 70. For example, an inkjet mechanism or the like is preferably usable. The head unit 70 is electrically connected with the controller 100, and is controlled by the controller 100.

Figure 3:
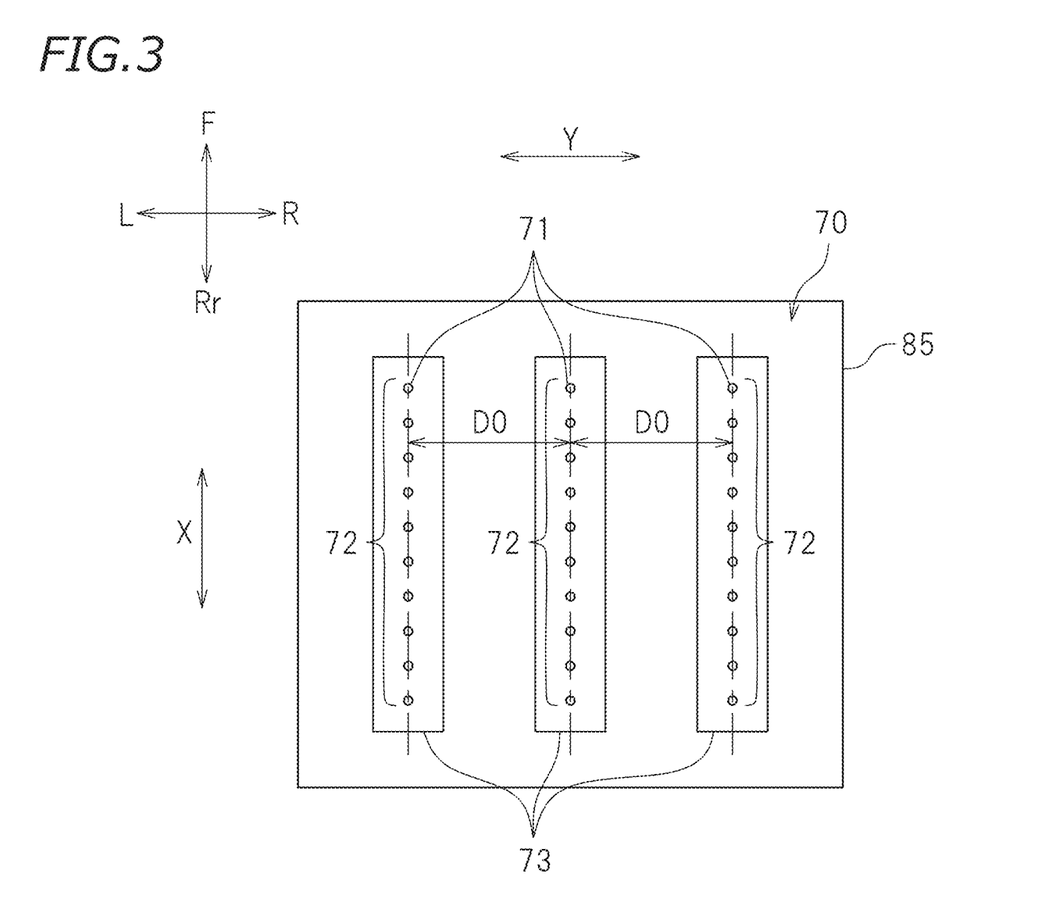
FIG. 3 is a bottom view schematically showing a carriage of the three-dimensional printing device according to preferred embodiment 1 of the present invention.

FIG. 3 is a bottom view schematically showing the carriage 85. As shown in FIG. 3, the head unit 70 includes a plurality of nozzle strings 72 each including a plurality of nozzles 71. The plurality of nozzles 71 included in each nozzle string 72 are located side by side in the sub scanning direction X. Each nozzle 71 ejects the curing liquid. Although FIG. 3 shows only a small number of the nozzles 71, the plurality of nozzles 71 in this preferred embodiment are located at a density of about 1200 dpi in the sub scanning direction X in each of the plurality of nozzle strings 72. Namely, 1200 nozzles 71 are located per inch. Alternatively, the plurality of nozzles 71 in each nozzle string 72 may be located at a density lower than about 1200 dpi, for example, at a density of about 360 dpi or about 720 dpi, in the sub scanning direction X.

As shown in FIG. 3, the head unit 70 includes a plurality of ejection heads 73. In this preferred embodiment, the plurality of ejection heads 73 each include one nozzle string 72. The plurality of ejection heads 73 are located side by side in the main scanning direction Y. Therefore, the plurality of nozzle strings 72 are also located side by side in the main scanning direction Y. In this preferred embodiment, the plurality of nozzle strings 72 are spaced away from each other by about 11 mm in the main scanning direction Y. Referring to FIG. 3, distance D0 is 11 mm in this preferred embodiment. About 11 mm as distance D0 is merely one preferred example of the distance between the plurality of nozzle strings 72. Distance D0 may be longer or shorter than about 11 mm. It is preferred that the distance between the plurality of nozzle strings 72 is about 5 mm or longer. A reason for this will be described below.

As the curing liquid, any liquid capable of bonding particles of the powder material 200 is usable with no specific limitation. As the curing liquid, a liquid (encompassing a viscous material) capable of bonding the particles of the powder material 200 is selected in accordance with the type of the powder material 200. The curing liquid may be, for example, a liquid containing water, wax, binder or the like. In the case where the powder material 200 contains a water-soluble resin as a sub material, the curing liquid may be a liquid capable of dissolving the water-soluble resin, for example, water. There is no specific limitation on the type of the water-soluble resin. Examples of the water-soluble resin include starch, polyvinyl alcohol (PVA), polyvinyl pyrrolidone (PVP), water-soluble acrylic resin, water-soluble urethane resin, water-soluble polyamide, and the like.

The main scanning direction moving mechanism 80 moves the carriage 85 in the main scanning direction Y. As shown in FIG. 2, the main scanning direction moving mechanism 80 includes a guide rail 81. The guide rail 81 extends in the main scanning direction Y. The carriage 85 is slidably engageable with the guide rail 81. The carriage 85 is, for example, connected with a carriage motor 82 (see FIG. 1) via, for example, an endless belt and a pulley. The carriage motor 82 is driven, and as a result, the carriage 85 moves in the main scanning direction Y along the guide rail 81. The carriage motor 82 is electrically connected with the controller 100, and is controlled by the controller 100. The carriage 85 moves in the main scanning direction Y, and as a result, the head unit 70 also moves in the main scanning direction Y.

As shown in FIG. 1, an operation panel 150 is provided on a front surface of the main body 11. The operation panel 150 includes a display portion that displays states of devices, input keys that are operable by a user, and the like. The operation panel 150 is connected with the controller 100 controlling various operations of the three-dimensional printing device 10. The controller 100 is electrically connected with the feed motor 22, the driving motor 43b of the supply table elevation mechanism 43, the driving motor 53b of the printing table elevation mechanism 53, the head unit 70 and the carriage motor 82, and controls operations thereof.

There is no specific limitation on the structure of the controller 100. The controller 100 is, for example, a microcomputer. There is no specific limitation on the hardware structure of the microcomputer. For example, the controller 100 includes an interface (I/F) receiving printing data or the like from an external device such as a host computer or the like, a central processing unit (CPU) executing a command in a control program, a read only memory (ROM) storing the program to be executed by the CPU, a random access memory (RAM) usable as a working area in which the program is developed, and a storage device, such as a memory or the like, storing the above-mentioned program, various data and the like. The controller 100 does not need to be provided in the three-dimensional printing device 10, and may be, for example, a computer or the like installed outside the three-dimensional printing device 10 and communicably connected with the three-dimensional printing device 10 in a wired or wireless manner.

The three-dimensional printing device 10 prints the printing object 230 in, for example, the following process. According to one preferred process, when the formation of one cured layer 220 is finished, the three-dimensional printing device 10 raises the supply table 42 and lowers the printing table 52. At the time when the formation of one cured layer 220 is finished, a top surface of the powder material 200 on the supply table 42 is at the same level as that of the bottom end of the spreading roller 31. At this point, a top surface of the cured layer 220 formed at the uppermost level in the printing tank 50 is also located at the same level as that of the bottom end of the spreading roller 31.

When the supply table 42 is raised from this state, a top part of the powder material 200 overflows the supply tank 40. Such a part of the powder material 200 that has overflown the supply tank 40 is supplied from the supply tank 40. The printing table 52 is lowered by a predetermined distance from the above-described state. The predetermined distance is equal to the thickness of the cured layer 220 to be formed next. When the powder material 200 is to be supplied, the printing table 52 is lowered by the thickness of one cured layer 220. The distance by which the printing table 52 is lowered is, for example, about 0.1 mm.

After this, the three-dimensional printing device 10 moves the spreading roller 31 forward with respect to the printing tank unit 12. At this point, the spreading roller 31 is not actually moved, but the printing tank unit 12 is moved rearward. This relative movement moves the spreading roller 31 from a position to the rear of the supply tank 40 to a position above the powder recovery tank 60 via a position above the supply tank 40 and a position above the printing tank 50. The spreading roller 31 newly spreads the powder material 200 on the printing table 52. As a result, a new powder layer 210 is formed on the printing table 52. A portion of the powder material 200 that is not spread on the printing table 52 drops into the powder recovery tank 60.

After the new powder layer 210 is formed on the cured layer 220 as described above, the three-dimensional printing device 10 controls the feed motor 22, the head unit 70 and the carriage motor 82 to cause the curing liquid to be ejected toward a desired position on the powder layer 210. As a result, a new cured layer 220 is formed on the powder layer 210. The above-described operations are repeated to form the printing object 230. This process is merely one preferred example, and the process for forming the printing object 230 is not limited to the above-described process.

While ejecting the curing liquid, the plurality of ejection heads 73 are spaced away from the powder layer 210 on the printing tank 50 by a predetermined distance in the up-down direction. Hereinafter, this distance will also be referred to as a "head gap". The head gap is a distance in the up-down direction between a bottom surface of the ejection heads 73 each including the nozzle string 72 (the bottom surface is also referred to as a "nozzle surface") and a top surface of the powder layer 210. In the up-down direction, the level of the top surface of the powder layer 210 is equal to the level of the bottom end of the spreading roller 31. In this preferred embodiment, the head gap is about 2 mm, for example. It should be noted that the head gap may be longer or shorter than about 2 mm.

It is known that the conventional three-dimensional printing device has a problem that the powder in the printing tank soars due to the ejection of the curing liquid. When the powder material that has soared is attached to a nozzle of an ejection head, there may be an undesirable possibility that the attached powder material is cured by the curing liquid. When the powder material attached to the nozzle is cured, an inconvenience occurs such that, for example, the nozzle is clogged or the flying direction of the curing liquid is curved.

According to the knowledge of the present inventor, the powder material soars because a great number of liquid drops of the curing liquid ejected from the head unit generate an updraft. The great number of liquid drops of the curing liquid are ejected at a high speed, and therefore, each generate an air flow between the nozzle and the powder layer. According to the knowledge of the present inventor, when two liquid drops of the curing liquid are ejected while being located at a short distance from each other especially in the main scanning direction Y, the air flows generated by the two liquid drops interfere with each other to generate an updraft. The powder material soars due to this updraft.

Based on this knowledge, the present inventor has conceived that when two liquid drops of the curing liquid are ejected while being located at a certain long distance from each other in the main scanning direction Y and the sub scanning direction X, especially in the main scanning direction Y, it may be possible that the air flows generated by the two liquid drops do not interfere with each other and thus the generation of the updraft is prevented.

In the three-dimensional printing device 10 in this preferred embodiment, the plurality of nozzles 71 in each of the nozzle strings 72 are located at a density of about 1200 dpi in the sub scanning direction X, and the plurality of nozzle strings 72 are spaced away from each other by about 11 mm in the main scanning direction Y perpendicular to the sub scanning direction X. Hereinafter, the degree of attachment of the powder material 200 to the nozzles 71 in the three-dimensional printing device 10 in this preferred embodiment will be shown in comparison with that in another three-dimensional printing device.

Figure 4:
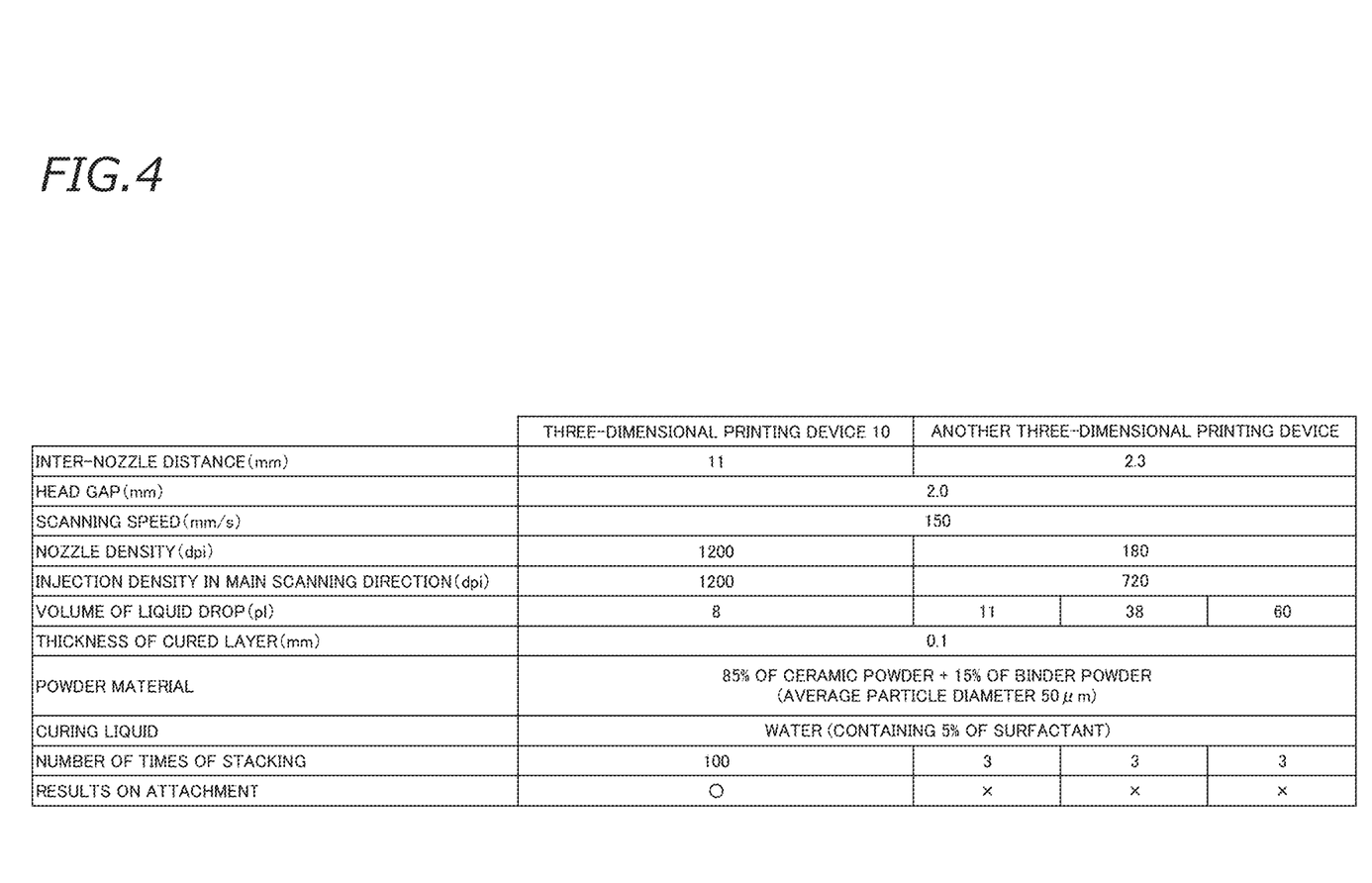
FIG. 4 is a table showing the degree of attachment of a powder material to nozzles in accordance with ejection conditions of a curing liquid.

FIG. 4 is a table showing the degree of attachment of the powder material to the nozzles in accordance with ejection conditions of the curing liquid. FIG. 4 shows the ejection conditions of the curing liquid in the three-dimensional printing device 10 in this preferred embodiment, and the degree of attachment of the powder material 200 under the conditions. FIG. 4 also shows a plurality of types of conditions of the curing liquid in another three-dimensional printing device, and the degrees of attachment of the powder material under each of the types of conditions.

As shown in FIG. 4, in the three-dimensional printing device 10 in this preferred embodiment, the distance between the plurality of nozzle strings 72 is about 11 mm, for example. The head gap is 2 mm. The carriage 85 scans at a speed of about 150 mm/s, for example. The density of the nozzles 71 in the sub scanning direction X is about 1200 dpi, for example. The curing liquid is ejected at a density of about 1200 dpi in the main scanning direction Y, for example. The liquid drops of the curing liquid each have a size (volume) of about 8 pl (picoliter), for example. The powder material 200 is mixed powder containing about 85% of ceramic powder and about 15% of binder powder, and has an average particle diameter of about 50 μm, for example. The curing liquid is water containing about 5% of surfactant, for example. One cured layer 220 has a thickness of about 0.1 mm, for example. As shown in FIG. 4, under such ejection conditions, the attachment of the powder material 200 to the nozzles 71 was not recognized even after 100 cured layers 220 were formed.

By contrast, in the another three-dimensional printing device, as shown in FIG. 4, the distance between the plurality of nozzles is about 2.3 mm. This distance is shorter than that of the three-dimensional printing device 10 in this preferred embodiment. The head gap is about 2 mm, which, for example, is equal to that of the three-dimensional printing device 10 in this preferred embodiment. The scanning speed of the carriage is about 150 mm/s, which, for example, is equal to that of the three-dimensional printing device 10 in this preferred embodiment. The density of the nozzles in the sub scanning direction is about 180 dpi. The ejection density of the curing liquid in the main scanning direction is about 720 dpi. The powder material and the curing liquid are the same as those used in the three-dimensional printing device 10 in this preferred embodiment. The thickness of the cured layer and the ejection range (area size) of the curing liquid are the same as those used in the three-dimensional printing device 10 in this preferred embodiment. Regarding the another three-dimensional printing device, tests were performed for the case where the curing liquid had volumes of about 11 pl, about 38 pl and about 60 pl.

As shown in FIG. 4, in the another three-dimensional printing device, the powder material was recognized to be attached to the nozzles after three cured layers were formed regardless of the size of the curing liquid. From these results, it is clear that the three-dimensional printing device 10 in this preferred embodiment prevents the attachment of the powder material to the nozzles more than the conventional three-dimensional printing device.

The ejection conditions that are the same for the three-dimensional printing device 10 and the another three-dimensional printing device are considered not to influence the above-described differences. Regarding the density of the nozzles in the sub scanning direction, among the conditions different for the two printing devices, it is considered that a lower density prevents the generation of the updraft and thus may decrease the amount of the powder material attached to the nozzles. Regarding the ejection density of the curing liquid in the main scanning direction, it is considered that a lower density causes the carriage to scan a smaller number of times and thus may decrease the amount of the powder material attached to the nozzles. In the tests shown in FIG. 4, the another three-dimensional printing device with a lower density of the nozzles in the sub scanning direction and a lower ejection density of the curing liquid in the main scanning direction causes a larger amount of the powder material to be attached than the three-dimensional printing device 10 according to this preferred embodiment. Therefore, the density of the nozzles in the sub scanning direction and the ejection density of the curing liquid in the main scanning direction are considered to contribute little to the prevention of the attachment of the powder material.

The size of the curing liquid does not influence the test results of the another three-dimensional printing device. Therefore, the size of the curing liquid is considered to contribute little to the prevention of the attachment of the powder material.

From the above-described considerations, it is considered that extension of the distance between the nozzle strings is effective to prevent or reduce the attachment of the powder material to the nozzles. From the test results in FIG. 4, in the case where the distance between the nozzles is about 11 mm or longer, for example, the attachment of the powder material to the nozzles may be substantially eliminated. It is sufficient that the density of the nozzles in the sub scanning direction is about 1200 dpi or lower, for example. As long as the density of the nozzles in the sub scanning direction is about 1200 dpi or lower, there is almost no influence on the attachment of the powder material to the nozzles.

In addition, the present inventor has conceived shortening the distance between the nozzle strings in the range in which the attachment of the powder material to the nozzles may be prevented. Shortening the distance between the nozzle strings makes the head unit more compact in the main scanning direction. Such a size reduction of the head unit in the main scanning direction realizes a predetermined ejection density in the main scanning direction within a short scanning time period.

According to the knowledge of the present inventor, as long as the plurality of nozzle strings are spaced away from each other by a distance of about 5 mm or longer in the main scanning direction Y, for example, the powder material is prevented from soaring and thus the attachment of the powder material to the nozzles may be prevented.

Based on results of a simulation of ejecting the curing liquid, it has been discovered that as long as the plurality of nozzle strings are spaced away from each other by a distance of about 5 mm or longer, for example, the generation of the updraft is decreased. Therefore, it is considered that in the case where the plurality of nozzle strings are spaced away from each other by a distance of about 5 mm or longer, for example, the powder material is prevented from soaring and thus the attachment of the powder material to the nozzles may be prevented. It should be noted that the effect of such a structure may not indicate that the powder material is not attached to the nozzles almost at all, but may indicate that the amount of the powder material attached to the nozzles is decreased as compared with the case of a conventional three-dimensional printing device, for example, the three-dimensional printing device in which the distance between the nozzle strings is about 2.3 mm.

Preferred Embodiment 2

In preferred embodiment 2, the plurality of nozzle strings are spaced away from each other by a distance shorter than the predetermined distance at which the powder material is prevented from soaring, but there is a restriction on the nozzle strings to be used at the same time. Accordingly, the distance between the nozzle strings used at the same time is kept equal to, or longer than, the predetermined distance at which the powder material is prevented from soaring. In the following description of preferred embodiment 2, components and portions having the same functions to those in preferred embodiment 1 will bear the same reference signs therewith, and overlapping descriptions will be omitted or simplified.

Figure 5:
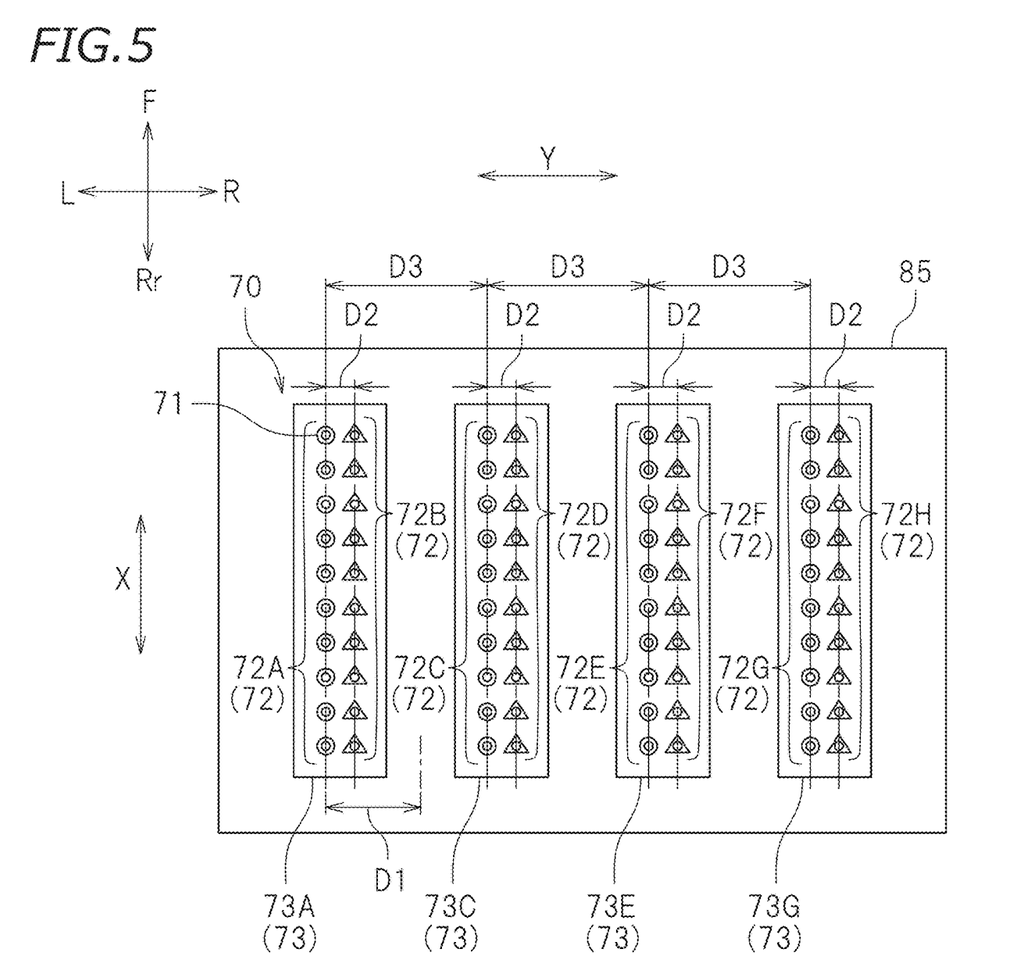
FIG. 5 is a bottom view schematically showing a carriage of a three-dimensional printing device according to preferred embodiment 2 of the present invention.

FIG. 5 is a bottom view schematically showing the carriage 85 of a three-dimensional printing device 10 according to preferred embodiment 2. As shown in FIG. 5, in this preferred embodiment, the plurality of ejection heads 73 each include two nozzle strings 72. In this preferred embodiment, the head unit 70 includes four ejection heads 73 located side by side in the main scanning direction Y. In the following description, the plurality of nozzle strings 72 will be respectively referred to as a "first nozzle string 72A" through an "eighth nozzle string 72H" from left to right in order to be distinguished from each other. The plurality of ejection heads 73 will be respectively referred to as a "first head 73A", a "second head 73C", a "third head 73E" and a "fourth head 73G" from left to right in order to be distinguished from each other. It should be noted that there is no specific limitation on the number of the ejection heads 73, and there is no specific limitation on the number of the nozzle strings 72 formed in each of the ejection heads 73.

As shown in FIG. 5, the first nozzle string 72A and the second nozzle string 72B are included in the first head 73A. The third nozzle string 72C and the fourth nozzle string 72D are included in the second head 73C. The fifth nozzle string 72E and the sixth nozzle string 72F are included in the third head 73E. The seventh nozzle string 72G and the eighth nozzle string 72H are included in the fourth head 73G.

The first nozzle string 72A through the eighth nozzle string 72H each include the plurality of nozzles 71, which are located side by side in the sub scanning direction X and each eject the curing liquid. As shown in FIG. 5, the first nozzle string 72A and the second nozzle string 72B are spaced at a distance from each other, shorter than a predetermined first distance D1 in the main scanning direction Y. In more detail, the first nozzle string 72A and the second nozzle string 72B are spaced away from each other by a second distance D2, which is shorter than the first distance D1. The first distance D1 is the distance between the nozzle strings 72 at which the powder material 200 is prevented from soaring. The first distance D1 may be set to, for example, about 5 mm. Alternatively, the first distance D1 may be set to a distance longer than about 5 mm and shorter than about 11 mm, for example. The first distance D1 may be set to about 11 mm, for example.

By contrast, the first nozzle string 72A and the third nozzle string 72C are spaced away from each other by a distance equal to, or longer than, the first distance D1 in the main scanning direction Y. In more detail, the first nozzle string 72A and the third nozzle string 72C are spaced away from each other by a third distance D3, which is longer than the first distance D1. It should be noted that the third distance D3 may be equal to the first distance D1. Similarly, the third nozzle string 72C and the fourth nozzle string 72D are spaced away from each other by the second distance D2 in the main scanning direction Y. The third nozzle string 72C and the fifth nozzle string 72E are spaced away from each other by the third distance D3 in the main scanning direction Y. The fifth nozzle string 72E and the sixth nozzle string 72F are spaced away from each other by the second distance D2 in the main scanning direction Y. The fifth nozzle string 72E and the seventh nozzle string 72G are spaced away from each other by the third distance D3 in the main scanning direction Y. The seventh nozzle string 72G and the eighth nozzle string 72H are spaced away from each other by the second distance D2 in the main scanning direction Y.

Therefore, although not shown, the distance between the second nozzle string 72B and the fourth nozzle string 72D, the distance between the fourth nozzle string 72D and the sixth nozzle string 72F, and the distance between the sixth nozzle string 72F and the eighth nozzle string 72H, in the main scanning direction Y are each the third distance D3.

The controller 100 in this preferred embodiment is configured or programmed such that in at least a portion of a time duration in which the head unit 70 ejects the curing liquid, the curing liquid is ejected from the nozzles 71 of the first nozzle string 72A, the third nozzle string 72C, the fifth nozzle string 72E and the seventh nozzle string 72G but is not ejected from any of the nozzles 71 of the second nozzle string 72B, the fourth nozzle string 72D, the sixth nozzle string 72F and the eighth nozzle string 72H. In more detail, the controller 100 in this preferred embodiment is configured or programmed to perform the above-described control in a portion of the time duration (hereinafter, this "portion" will be referred to as a "first time period") in which the head unit 70 ejects the curing liquid. In FIG. 5, the nozzles 71 from which the curing liquid is ejected in the first time period are represented with double circles.

The controller 100 in this preferred embodiment is configured or programmed such that in another portion of the time duration (hereinafter, the "another portion" will be referred to as a "second time period") in which the head unit 70 ejects the curing liquid, the curing liquid is ejected from the nozzles 71 of the second nozzle string 72B, the fourth nozzle string 72D, the sixth nozzle string 72F and the eighth nozzle string 72H but is not ejected from any of the nozzles 71 of the first nozzle string 72A, the third nozzle string 72C, the fifth nozzle string 72E and the seventh nozzle string 72G. In FIG. 5, the nozzles 71 from which the curing liquid is ejected in the second time period are represented with triangles.

It should be noted that the controller 100 may be set such that in the entirety of the time duration in which the head unit 70 ejects the curing liquid, the curing liquid is ejected from the nozzles 71 of the first nozzle string 72A, the third nozzle string 72C, the fifth nozzle string 72E and the seventh nozzle string 72G but is not ejected from any of the nozzles 71 of the second nozzle string 72B, the fourth nozzle string 72D, the sixth nozzle string 72F and the eighth nozzle string 72H. Alternatively, the controller 100 may be set such that in the entirety of the time duration in which the head unit 70 ejects the curing liquid, the curing liquid is ejected from the nozzles 71 of the second nozzle string 72B, the fourth nozzle string 72D, the sixth nozzle string 72F and the eighth nozzle string 72H but is not ejected from any of the nozzles 71 of the first nozzle string 72A, the third nozzle string 72C, the fifth nozzle string 72E and the seventh nozzle string 72G. In other words, the three-dimensional printing device 10 may use only the odd-numbered nozzle strings 72A, 72C, 72E and 72G or only the even-numbered nozzle strings 72B, 72D, 72F and 72H.

Figure 6:
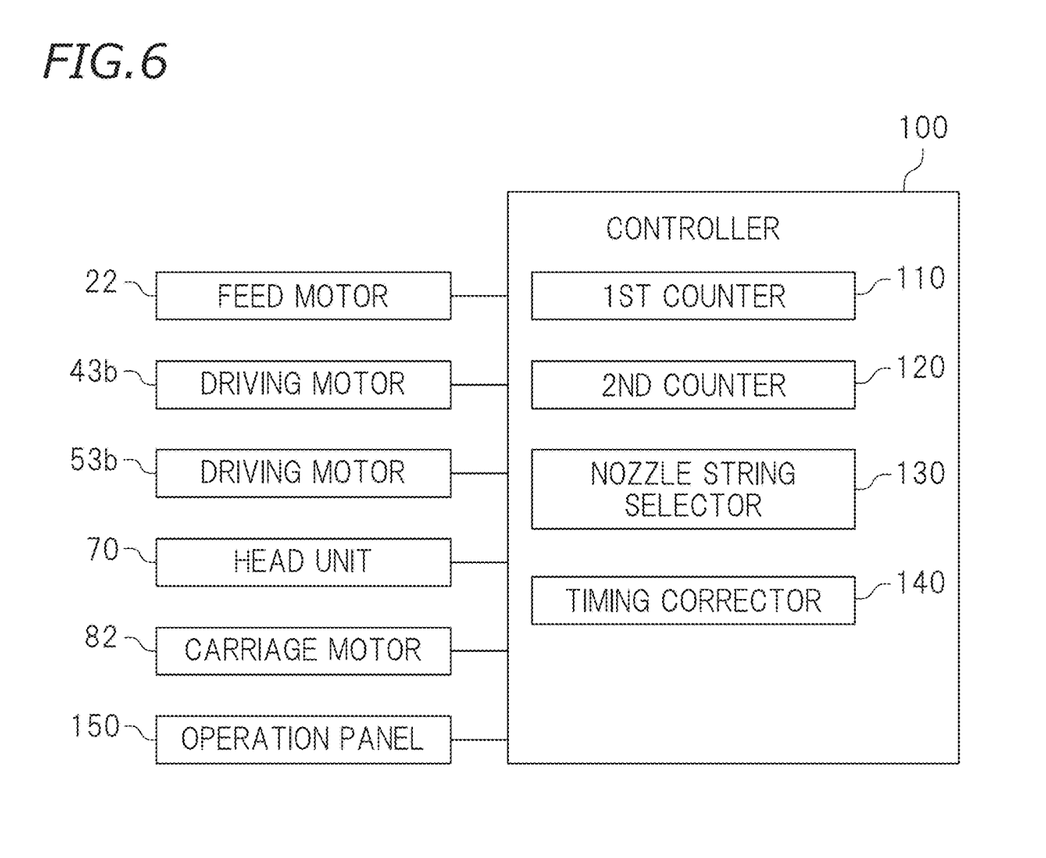
FIG. 6 is a block diagram of the three-dimensional printing device according to preferred embodiment 2 of the present invention.

FIG. 6 is a block diagram of the three-dimensional printing device 10 according to this preferred embodiment. As shown in FIG. 6, in this preferred embodiment, the controller 100 is configured or programmed to include a first counter 110, a second counter 120, a nozzle string selector 130, and a timing corrector 140. The first counter 110 counts an accumulated time duration in which the curing liquid is ejected from the odd-numbered nozzle strings 72A, 72C, 72E and 72G (in other words, the accumulated time duration of the first time period). When the accumulated time duration counted by the first counter 110 exceeds a predetermined time duration, the even-numbered nozzle strings 72B, 72D, 72F and 72H are used to form the next and the subsequent cured layers 220. The second counter 120 counts an accumulated time duration in which the curing liquid is ejected from the even-numbered nozzle strings 72B, 72D, 72F and 72H (in other words, the accumulated time duration of the second time period). When the accumulated time duration counted by the second counter 120 exceeds a predetermined time duration, the odd-numbered nozzle strings 72A, 72C, 72E and 72G are used again to form the next and the subsequent cured layers 220.

The nozzle string selector 130 selects the nozzle strings 72 to be used based on the counting results of the first counter 110 and the second counter 120. The timing corrector 140 corrects the timing at which the curing liquid is ejected, in accordance with the selected nozzle strings 72.

Such a control is merely an example. There is no specific limitation on the control method for selecting the nozzle strings 72. For example, the first time period may be switched to the second time period, or vice versa, each time a predetermined number of shots of the curing liquid are made. In this case, the first counter 110 counts an accumulated number of times by which the curing liquid is ejected from the odd-numbered nozzle strings 72A, 72C, 72E and 72G. In this case, the second counter 120 counts an accumulated number of times by which the curing liquid is ejected from the even-numbered nozzle strings 72B, 72D, 72F and 72H. Alternatively, the first time period may be switched to the second time period, or vice versa, each time a predetermined number of cured layers 220 are formed. The first time period may be switched to the second time period, or vice versa, each time a predetermined number of jobs are made. In such a case, the first counter 110 and the second counter 120 count an accumulated number of the cured layers 220 or an accumulated number of jobs.

The controller 100 may include another control portion having another function although such a portion is not described or shown in any of the figures.

According to the above-described control, the distance between the plurality of nozzle strings 72 used at the same time is kept to a distance equal to, or longer than, the first distance D1. Therefore, the attachment of the powder material 200 to the nozzles 71 is prevented. A portion of the nozzle strings 72 is used in the first time period and another portion of the nozzle strings 72 is used in the second time period. Therefore, use of only a portion of the nozzle strings 72 in a lopsided manner is avoided, and thus the life of the head unit 70 may be extended.

In the above-described preferred embodiments, the odd-numbered nozzle strings 72A, 72C, 72E and 72G are used in one time period, and the even-numbered nozzle strings 72B, 72D, 72F and 72H are used in another time period. How the nozzle strings to be used are allotted by the time period may be varied in accordance with the positional arrangement of the nozzle strings. Even in the case where the positional arrangement of the nozzle strings is the same as above, how the nozzle strings to be used are allotted by the time period is not limited to the above. For example, the nozzle strings 72 may be allotted such that the first nozzle string 72A and the fifth nozzle string 72E are used in the first time period, the second nozzle string 72B and the sixth nozzle string 72F are used in the second time period, the third nozzle string 72C and the seventh nozzle string 72G are used in a third time period, and the fourth nozzle string 72D and the eighth nozzle string 72H are used in a fourth time period. Only one nozzle string may be used in one time period. It is sufficient that the nozzle strings used at the same time are spaced away from each other by a distance equal to, or longer than, the first distance D1. There is no further limitation.

Some preferred embodiments of the present invention are described above. The above-described preferred embodiments are merely examples, and the present invention may be carried out in any of various other preferred embodiments.

For example, in the above-described preferred embodiments, the head unit is mounted on the carriage movable in the main scanning direction. Alternatively, the three-dimensional printing device may be of a so-called line head system. In such a case, the head unit may include a plurality of nozzle strings extending in the main scanning direction, and the nozzle strings may be unmovable in the main scanning direction. In addition, the plurality of nozzle strings may be located side by side in the sub scanning direction while being away from each other by a predetermined distance or longer. Alternatively, only a portion of the nozzle strings that are spaced away from each other by a predetermined distance or longer in the sub scanning direction may be used at the same time. There is no specific limitation on the direction in which the nozzle strings extend or the direction in which the nozzle strings are located side by side.

In the above-described preferred embodiments, the plurality of nozzle strings are positionally aligned in the sub scanning direction. The plurality of nozzle strings have the same length as each other. Alternatively, the plurality of nozzle strings may be located in a so-called staggered manner, so that a portion of, or the entirety of, the plurality of nozzle strings may be positionally shifted in the sub scanning direction.

There is no specific limitation on the method for ejecting the curing liquid. The curing liquid may be ejected by being driven by a piezoelectric element, or by any other method such as a thermal method or the like. The above-described structure of the three-dimensional printing device is merely an example. There is no specific limitation on the structure of the three-dimensional printing device. There is no specific limitation on the conditions for ejecting the curing liquid, the type or the properties of the curing liquid or the powder material, the shape of the printing object to be printed, or the like, unless otherwise specified. The preferred embodiments disclosed herein do not limit the present invention unless otherwise specified.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing device, comprising:
   a printing tank to accommodate a powder material and including an opening in at least a portion thereof; and
   an ejector facing the opening of the printing tank to eject a curing liquid to cure the powder material toward the opening; wherein
   the ejector includes a plurality of nozzle strings each including a plurality of nozzles side by side in a predetermined first direction to eject the curing liquid;
   the plurality of nozzles are located in each of the plurality of nozzle strings at a density of about 1200 dpi or lower in the first direction;
   the plurality of nozzle strings are spaced away from each other by a distance of about 5 mm or longer in a second direction perpendicular to the first direction;
   the powder material includes ceramic powder and binder powder; and
   the curing liquid is water including surfactant.

2. The three-dimensional printing device according to claim 1, wherein the plurality of nozzle strings are spaced away from each other by a distance of about 11 mm or longer in the second direction.

3. A three-dimensional printing device, comprising:
   a printing tank to accommodate a powder material and including an opening in at least a portion thereof;
   an ejector facing the opening of the printing tank to eject a curing liquid to cure the powder material toward the opening; and
   a controller to control the ejector to eject the curing liquid; wherein
   the powder material includes ceramic powder and binder powder;
   the curing liquid is water including surfactant;
   the ejector includes:
      a first nozzle string including a first plurality of nozzles side by side in a predetermined first direction to eject the curing liquid;
      a second nozzle string including a second plurality of nozzles side by side in the first direction to eject the curing liquid; and
      a third nozzle string including a third plurality of nozzles side by side in the first direction to eject the curing liquid;
   the first nozzle string and the second nozzle string are spaced away from each other by a distance shorter than 5 mm in a second direction perpendicular to the first direction;
   the first nozzle string and the third nozzle string are spaced away from each other by a distance equal to, or longer than, 5 mm in the second direction; and
   the controller is configured or programmed to, in at least a portion of a time duration in which the ejector ejects the curing liquid, cause the curing liquid to be ejected from the first plurality of nozzles of the first nozzle string and the third plurality of nozzles of the third nozzle string but not to be ejected from the second plurality of nozzles of the second nozzle string.

4. The three-dimensional printing device according to claim 3, wherein the controller is configured or programmed to:
   in a portion of the time duration in which the ejector ejects the curing liquid, cause the curing liquid to be ejected from the first plurality of nozzles of the first nozzle string and the third plurality of nozzles of the third nozzle string but not to be ejected from the second plurality of nozzles of the second nozzle string; and
   in another portion of the time duration in which the ejector ejects the curing liquid, cause the curing liquid to be ejected from at least the second plurality of nozzles of the second nozzle string but not to be ejected from the first plurality of nozzles of the first nozzle string.

5. The three-dimensional printing device according to claim 4, wherein the controller is configured or programmed to include:
- a first counter to count an accumulated time duration in which the curing liquid is ejected from the first plurality of nozzles of the first nozzle string and the third plurality of nozzles of the third nozzle string but not ejected from the second plurality of nozzles of the second nozzle string;
- a second counter to count an accumulated time duration in which the curing liquid is ejected from at least the second plurality of nozzles of the second nozzle string but not ejected from the first plurality of nozzles of the first nozzle string; and
- a nozzle string selector to stop the ejection of the curing liquid from the first plurality of nozzles of the first nozzle string and the third plurality of nozzles of the third nozzle string, and cause the curing liquid to be ejected from the second plurality of nozzles of the second nozzle string, when the accumulated time duration counted by the first counter exceeds a predetermined time duration, and to stop the ejection of the curing liquid from at least the second plurality of nozzles of the second nozzle string, and cause the curing liquid to be ejected from the first plurality of nozzles of the first nozzle string, when the accumulated time duration counted by the second counter exceeds a predetermined time duration.

6. The three-dimensional printing device according to claim 4, wherein the controller is configured or programmed to include:
- a first counter to count an accumulated number of times by which the curing liquid is ejected from the first plurality of nozzles of the first nozzle string and the third plurality of nozzles of the third nozzle string; and
- a second counter to count an accumulated number of times by which the curing liquid is ejected from the second plurality of nozzles of the second nozzle string; and
- a nozzle string selector to stop the ejection of the curing liquid from the first plurality of nozzles of the first nozzle string and the third plurality of nozzles of the third nozzle string, and cause the curing liquid to be ejected from the second plurality of nozzles of the second nozzle string, when the accumulated number of times counted by the first counter exceeds a predetermined number of times, and stop the ejection of the curing liquid from at least the second plurality of nozzles of the second nozzle string, and cause the curing liquid to be ejected from the first plurality of nozzles of the first nozzle string, when the accumulated number of times counted by the second counter exceeds a predetermined number of times.

7. The three-dimensional printing device according to claim 4, wherein the controller is configured or programmed to include:
- a first counter to count an accumulated number of cured layers formed by ejection of the curing liquid from the first plurality of nozzles of the first nozzle string and the third plurality of nozzles of the third nozzle string; and
- a second counter to count an accumulated number of cured layers formed by ejection of the curing liquid from the second plurality of nozzles of the second nozzle string; and
- a nozzle string selector to stop the ejection of the curing liquid from the first plurality of nozzles of the first nozzle string and the third plurality of nozzles of the third nozzle string, and cause the curing liquid to be ejected from the second plurality of nozzles of the second nozzle string, when the accumulated number of the cured layers counted by the first counter exceeds a predetermined number, and stop the ejection of the curing liquid from at least the second plurality of nozzles of the second nozzle string, and cause the curing liquid to be ejected from the first plurality of nozzles of the first nozzle string, when the accumulated number of the cured layers counted by the second counter exceeds a predetermined number.

8. The three-dimensional printing device according to claim 3, wherein:
- the first nozzle string and the second nozzle string are spaced away from each other by a distance shorter than 11 mm in the second direction; and
- the first nozzle string and the third nozzle string are spaced away from each other by a distance equal to, or longer than, 11 mm in the second direction.

* * * * *